United States Patent
Dölling et al.

(10) Patent No.: US 6,712,388 B2
(45) Date of Patent: Mar. 30, 2004

(54) HYBRID GAS GENERATOR

(75) Inventors: Uwe Dölling, Ampfing (DE); Lorenz Seidl, Waldkraiburg (DE); Maximilian Bergmann, Mühldorf (DE); Alexander Gerstner, Waldkraiburg (DE); Achim Hofmann, Polling (DE); Anja Esau, Ampfing (DE); Werner Zengerle, Regensburg (DE); Jens Holzapfel, Klein Grenz (DE); Nils Henning, Rostock (DE)

(73) Assignee: TRW Airbag Systems GmbH & Co. KG, Aschau (DE)

( * ) Notice: Subject to any disclaimer, the term of this patent is extended or adjusted under 35 U.S.C. 154(b) by 13 days.

(21) Appl. No.: 10/235,319

(22) Filed: Sep. 5, 2002

(65) Prior Publication Data

US 2003/0057690 A1 Mar. 27, 2003

(30) Foreign Application Priority Data

Sep. 5, 2001 (DE) ..................... 201 14 665 U

(51) Int. Cl.[7] ............................... B60R 21/26
(52) U.S. Cl. ................... 280/736; 280/737; 280/741
(58) Field of Search ................. 280/736, 737, 280/741, 742; 102/530, 531; 222/3

(56) References Cited

U.S. PATENT DOCUMENTS

| 5,487,559 A | | 1/1996 | Headley | |
|---|---|---|---|---|
| 5,630,619 A | * | 5/1997 | Buchanan et al. | 280/741 |
| 5,762,368 A | * | 6/1998 | Faigle et al. | 280/737 |
| 5,854,441 A | | 12/1998 | Metzger | |
| 5,941,561 A | | 8/1999 | Fritz et al. | |
| 6,089,597 A | * | 7/2000 | Leifheit et al. | 280/737 |
| 6,612,326 B2 | * | 9/2003 | Specht et al. | 137/68.13 |
| 2002/0185849 A1 | * | 12/2002 | Sawa et al. | 280/741 |

FOREIGN PATENT DOCUMENTS

| DE | 19548571 C1 | 5/1997 |
|---|---|---|
| DE | 19545052 A1 | 6/1997 |
| DE | 19617674 A1 | 11/1997 |
| EP | 0639483 A1 | 2/1995 |

* cited by examiner

Primary Examiner—David R. Dunn
(74) Attorney, Agent, or Firm—Tarolli, Sundheim, Covell, & Tummino L.L.P.

(57) ABSTRACT

A hybrid gas generator comprises an elongated cylindrical outer housing, and a pressure chamber that is filled with pressurized gas and that is closed off by a membrane provided on an end face of the pressure chamber. The gas generator further comprises a pyrotechnical propellant charge that is provided for opening the membrane and is accommodated in a preferably bushing-shaped propellant charge housing. The propellant charge housing is connected to the outer housing at a location outside of the pressure chamber and a longitudinal axis of the propellant charge housing extends at a right angle to a longitudinal axis of the outer housing. The generator also has an axial outflow opening situated at one axial end of the outer housing. The outer housing has a circumferential wall with a radial insertion opening for introducing the propellant charge housing. The propellant charge housing is attached to a section of the circumferential wall diametrically opposite the insertion opening in such a way that the propellant charge housing is secured at least against a movement in the direction of the longitudinal axis of the outer housing.

11 Claims, 3 Drawing Sheets

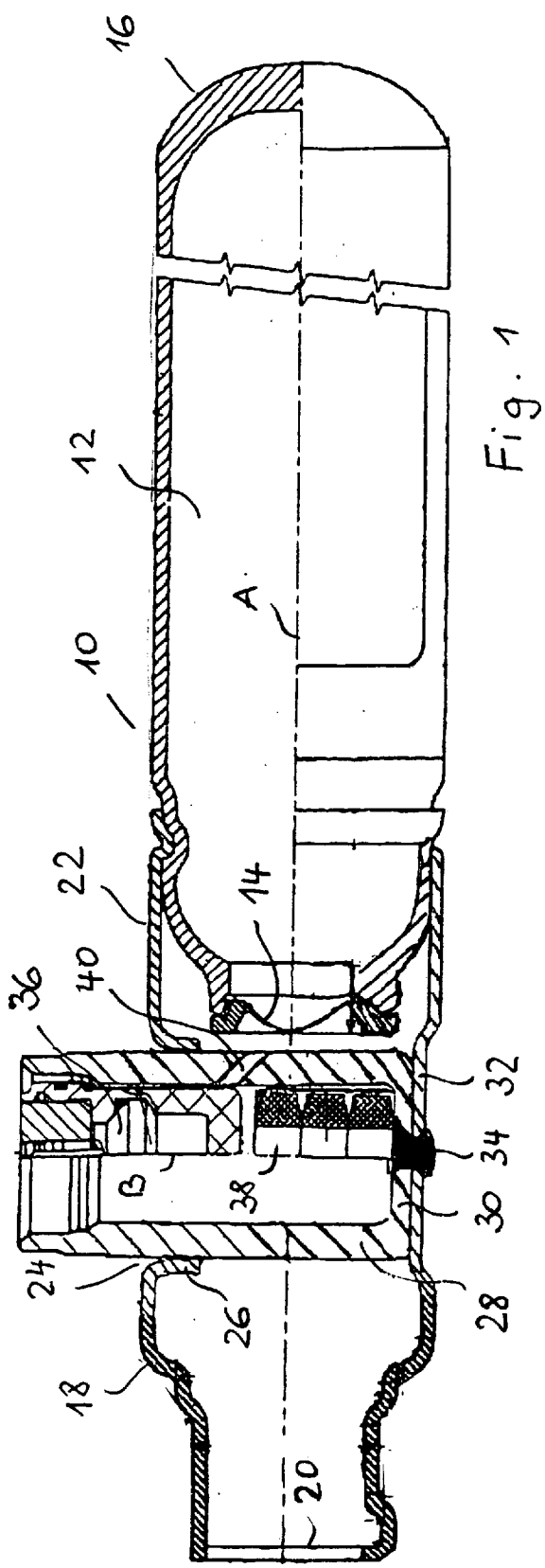
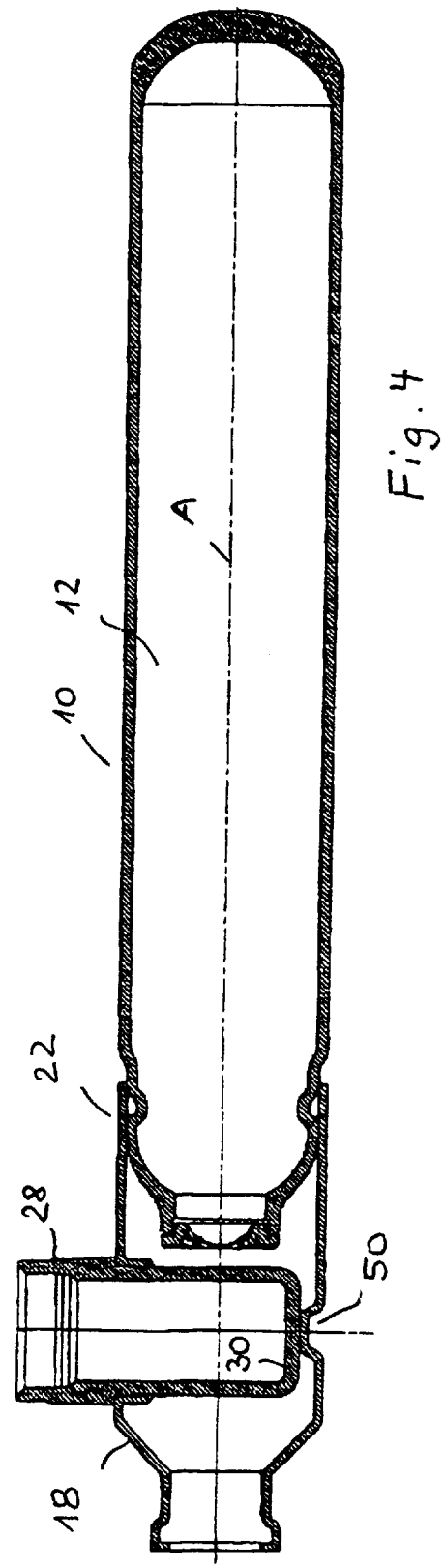

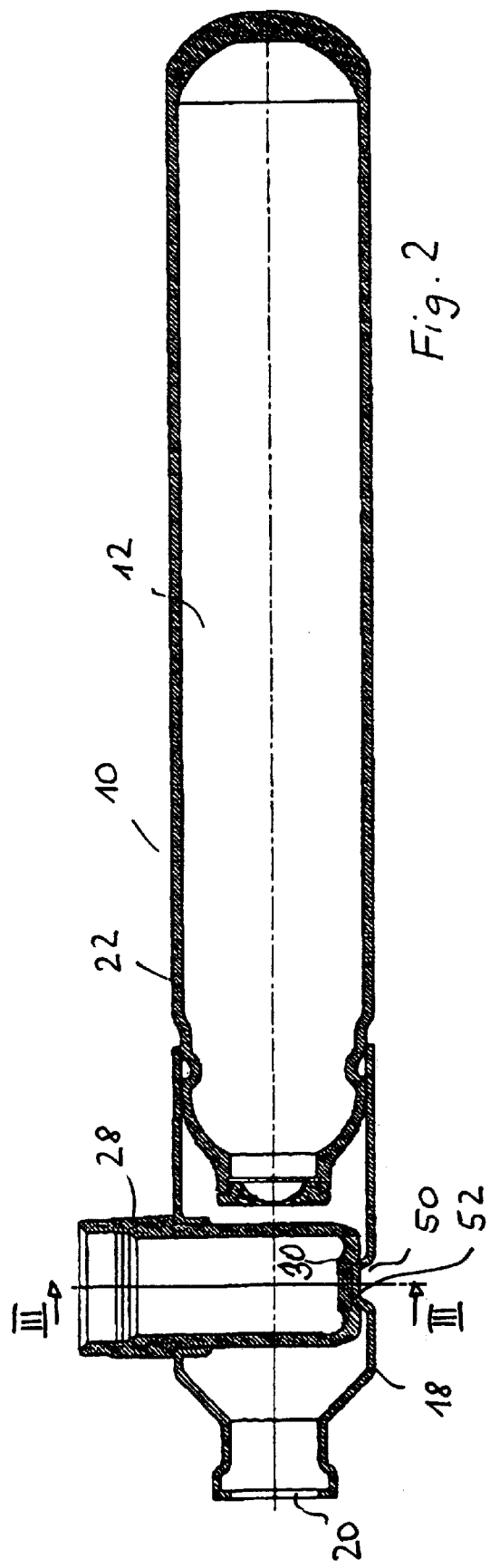
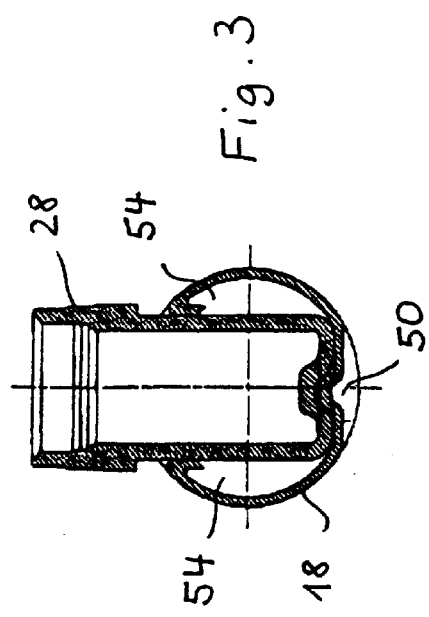

HYBRID GAS GENERATOR

TECHNICAL FIELD

The invention relates to a hybrid gas generator.

BACKGROUND OF THE INVENTION

Conventional hybrid gas generators comprise an elongated cylindrical outer housing, a pressure chamber that is filled with pressurized gas and that is closed off by a membrane provided on the end face of the pressure chamber, a pyrotechnical propellant charge that is provided for opening the membrane and is accommodated in a preferably bushing-shaped propellant charge housing, the latter being connected to the outer housing at a location outside of the pressure chamber and the longitudinal axis of the propellant charge housing extending at a right angle to the longitudinal axis of the outer housing, and an axial outflow opening situated at one axial end of the outer housing.

Such gas generators are used, for example, to inflate an airbag or to actuate a belt tensioner. Due to the axial outflow opening on the end face, the radial construction space is kept small in comparison to generators with radial outflow openings.

BRIEF SUMMARY OF THE INVENTION

The invention provides a hybrid gas generator that is configured simply and that stands out for its small radial construction space. According to the invention, the hybrid gas generator comprises an elongated cylindrical outer housing having a longitudinal axis, and a pressure chamber that is filled with pressurized gas and that is closed off by a membrane provided on an end face of the pressure chamber. The gas generator further comprises a pyrotechnical propellant charge that is provided for opening the membrane and is accommodated in a preferably bushing-shaped, separate propellant charge housing. The propellant charge housing is connected to the outer housing at a location outside of the pressure chamber and a longitudinal axis of the propellant charge housing extends at a right angle to a longitudinal axis of the outer housing. The generator also has an axial outflow opening situated at one axial end of the outer housing. The outer housing has a circumferential wall with a radial insertion opening for introducing the propellant charge housing. The propellant charge housing is attached to a section of the circumferential wall diametrically opposite the insertion opening in such a way that the propellant charge housing is secured at least against a movement in the direction of the longitudinal axis of the outer housing. With the hybrid gas generator according to the invention, the bushing-shaped propellant charge housing is radially inserted completely into the outer housing until it comes to lie against the section opposite the insertion opening, where it is secured such that it cannot be moved in lateral direction by the gas when the latter flows out. When the pressure chamber opens, the gas then flows laterally along the propellant charge housing, between the latter and the outer housing, towards the axial outflow opening. Since the propellant charge housing is inserted almost completely into the outer housing, it only protrudes slightly from it, which saves construction space. Furthermore, the attachment to the circumferential wall firmly secures the propellant charge housing which is then locked in two places, namely, in the area of the edge of the insertion opening and on the opposite section of the circumferential wall. The propellant charge housing is attached to the section of the circumferential wall by means of a form-fitting or a frictional fitting connection, by gluing or by welding, as a result of which there is no need for complex fastening means such as threaded connections or the like.

The edge of the radial insertion opening is configured as a cylindrical guide neck, which improves the positional stability of the propellant charge housing, especially until it has been attached to the section of the circumferential wall.

The propellant charge housing preferably has an end wall with which it lies against the circumferential wall and where it is attached to the latter. In the propellant charge housing, there are provided an igniter and an additional propellant charge. During combustion, the additional propellant charge produces hot gas that can mix with the cold pressurized gas.

The propellant charge housing has at least one opening oriented towards the membrane and, through this opening, combustion products are intentionally directed towards the membrane in order to destroy it in a predictable manner.

BRIEF DESCRIPTION OF THE DRAWINGS

FIG. 1 is a longitudinal sectional view through a first embodiment of the hybrid gas generator according to the invention;

FIG. 2 is a longitudinal sectional view through a second embodiment of the hybrid gas generator according to the invention;

FIG. 3 shows a cross-section through the gas generator of FIG. 2 along the line III—III, FIG. 4 is a longitudinal sectional view through a third embodiment of the hybrid gas generator according to the invention.

DETAILED DESCRIPTION OF THE PREFERRED EMBODIMENTS

Figure 5:
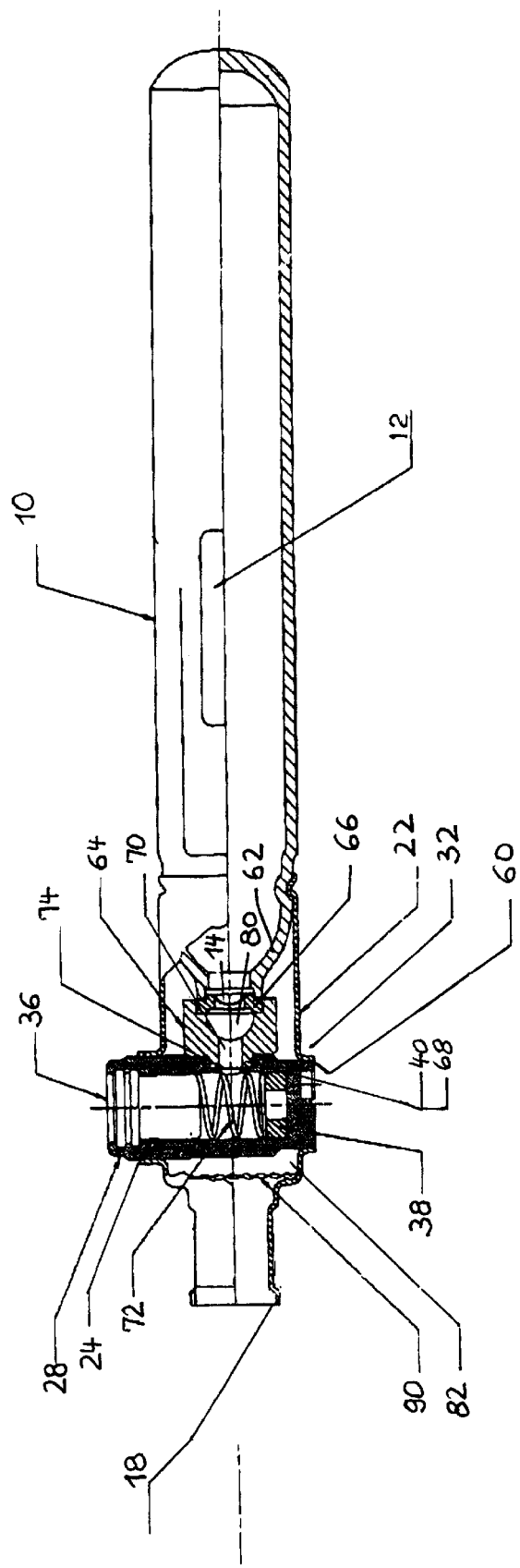
FIG. 5 is a longitudinal sectional view through a fourth embodiment of the hybrid gas generator of the invention.

FIG. 1 shows a hybrid gas generator that has an elongated cylindrical outer housing 10 as well as a pressure chamber 12 that is filled with pressurized gas and that is closed off by a membrane 14 at the end face. The pressure chamber 12 is made up of a bottle-shaped tank 16 that partially defines the outer housing of the gas generator. At the side of the membrane, a sleeve 18 is placed on the tank 16 and connected to the tank 16 by means of rolling or welding. The sleeve 18 is open at its face at the end opposite the membrane 14, the opening forming an axial outflow opening 20. Consequently, the outer housing has an open end face, an opposite end face that is closed off by the end wall of the tank 16 as well as a circumferential wall 22 defined by the sleeve 18 and the jacket of the tank 16. Near the membrane 14 and outside of the combustion chamber 12, the sleeve 18 has a radial insertion opening 24 whose edge is bent inwards to form a cylindrical guide neck 26. A bushing-shaped propellant charge housing 28 formed by a separate part is inserted into the insertion opening 24 sufficiently deep so that its end wall 30 touches a section 32 of the sleeve 18 that is diametrically opposite the insertion opening 24 and, hence, touches the circumferential wall 22. In this area, the outer housing 10 and the propellant charge housing 28 are connected to each other by a weld seam 34. No additional attachment between the propellant charge housing 28 and the outer housing 10 is provided in the area of the guide neck 26.

As can be seen in FIG. 1, the axes A and B of the outer housing 10 and the propellant charge housing 28, respectively, are perpendicular to each other and intersect each other.

An igniter 36 and a pyrotechnical propellant charge 38 are accommodated in the propellant charge housing. An oblique outflow opening 40 penetrates the propellant charge housing 28 and is oriented towards the membrane 14.

The activation of the igniter 36 leads to the combustion of the propellant charge 38. Hot gas being formed flows via the opening 40 onto the membrane 14, which is then thermally destroyed or weakened to such an extent that it ruptures. The pressurized gas flows out of the pressure chamber 12 and mixes with the hot gas in the sleeve 18. The gas mixture flows laterally along between the propellant charge housing 28 and the sleeve 18 to the outflow opening 20, where it leaves the gas generator in the axial direction.

The gas generator shown is made up of few parts and is of very simple construction; the welding 34 can be done from outside of the outer housing 10.

The embodiment according to FIG. 2 corresponds essentially to that of FIG. 1, which is why the already introduced reference numerals are used for parts having the same function. Therefore, only the differences between the two gas generators will be discussed below.

The propellant charge housing 28 is attached to the outer housing 10 by a form-fitting connection that acts only in the direction of the axis A in that the sleeve 18 is provided with a projection 50 which is oriented radially inwards and projects into an indentation 52 of the end wall 30. In FIG. 3, the reference numeral 54 designates the two channels provided to the side of the propellant charge housing 28 between the latter and the sleeve 18; the released pressurized gas flows through these channels to the outflow opening 20 once it has left the pressure chamber 12.

In the embodiment according to FIG. 4, the end wall 30 does not have an indentation, but it lies against the projection 52 and is attached thereto by means of glue.

The propellant charge 38 can optionally be left out so that the membrane 14 is opened only by the pyrotechnical propellant charge provided in the igniter 36.

In the embodiment according to FIG. 5, the circumferential wall 22 has a through-hole 60 on the opposite section 32, this through-hole being aligned with the insertion opening 24 and being preferably slightly smaller than the latter. The propellant charge housing 28 is inserted from above into the insertion opening 24 and the through-hole 60 (which likewise is equipped with a guide neck) and is secured therein by means of a press fit. Such fit may also be realized as a loose fit or transition fit if a leakage is allowed. In this case, however, the displacement of the propellant charge housing 28 in the direction of insertion will be prevented exclusively by the spacer 64 explained in the following.

The pressure chamber 12 has an end wall 62 facing the propellant charge housing 28. A spacer 64 is provided in the interior of the outer housing 10 between the propellant charge housing 28 and the end wall 62, this spacer being fixed to the membrane holder 66, on the one hand, and inserted with a protrusion 68 in the radial opening 40, on the other.

The spacer 64 is hollow and forms a conduit 70 extending from the interior of the propellant charge housing 28 to the membrane 14. Gas being generated upon activation of the igniter 36 and of the propellant charge 38 (spaced away from the igniter 36 by a spring 72), leaves the propellant charge housing 28 and is directed to the membrane 14 in order to destroy it. Upstream of the membrane 14, the conduit ends in a transverse bore 80 which makes a flow connection between the conduit 70 and the space 82. Through this transverse bore 80, the gas from the pressure chamber 12 leaves the tank 16. A filter disc upstream of the outflow opening 20 is denoted by 90. Prior to activation of the igniter 36, the inlet side of the conduit 70 is closed by an insulation 74.

In addition to securing the propellant charge housing 28 against a lateral displacement and directing the gas stream, the spacer 64 has a further function, i.e. it precisely defining the distance between the propellant charge housing 28 and the membrane 14 during manufacture. When the propellant charge housing 28 has been inserted in the circumferential wall 22, the tank 16 including the membrane holder 66 and the spacer 64 are inserted (with respect to the Figures) in the right-hand side, open end face into the sleeve 18, until the protrusion 68 has penetrated opening 40. Subsequently, the sleeve 18 and the tank 16 are connected to each other by rolling; during such process, the tank 16 including the spacer 64 are pressed against the propellant charge housing 28.

What is claimed is:

1. A hybrid gas generator comprising an elongated cylindrical outer housing having a longitudinal axis, a pressure chamber that is filled with pressurized gas and that is closed off by a membrane provided on an end face of said pressure chamber, a pyrotechnical propellant charge that is provided for opening said membrane and is accommodated in a separate propellant charge housing, said propellant charge housing being connected to said outer housing at a location outside of said pressure chamber and a longitudinal axis of said propellant charge housing extending at a right angle to said longitudinal axis of said outer housing, and an axial outflow opening situated at one axial end of said outer housing, wherein the improvement comprises
said outer housing having a circumferential wall with a radial insertion opening for introducing said propellant charge housing,
said propellant charge housing being attached to a section of said circumferential wall diametrically opposite said insertion opening in such a way that said propellant charge housing is secured at least against a movement in the direction of said longitudinal axis of said outer housing.

2. The hybrid gas generator according to claim 1, wherein said propellant charge housing is attached to said section of said circumferential wall by means of at least one of a form-fitting, a frictional fitting, a glued and a welded connection.

3. The hybrid gas generator according to claim 1, wherein an edge of said insertion opening is configured as a cylindrical guide neck.

4. The hybrid gas generator according to claim 1, wherein said propellant charge housing has an end wall with which it lies against said circumferential wall.

5. The hybrid gas generator according to claim 1, wherein an igniter and an additional propellant charge are provided in said propellant charge housing.

6. The hybrid gas generator according to claim 1, wherein said propellant charge housing has at least one opening which is oriented towards said membrane.

7. The hybrid gas generator according to claim 1, wherein said propellant charge housing has the shape of a bushing.

8. The hybrid gas generator according to claim 1, wherein said circumferential wall has a hole at said opposite section, said propellant charge housing being put into said hole.

9. The hybrid gas generator according to claim 1, wherein said pressure chamber has an end wall facing said propellant charge housing and wherein a spacer is provided in the interior of said outer housing between said propellant charge housing and said end wall, said spacer engaging said propellant charge housing.

10. The hybrid gas generator according to claim 9, wherein said spacer is hollow and forms a conduit between said propellant charge housing and said membrane, so that gas leaving said propellant charge housing is directed to said membrane.

11. The hybrid gas generator according to claim 9, wherein said spacer and said propellant charge housing are connected to each other in an interlocking fashion such that said spacer serves as a safety device against a displacement of said propellant charge housing in the direction of insertion of the latter.

* * * * *